United States Patent [19]

Pierson

[11] 4,377,479

[45] Mar. 22, 1983

[54] VACUUM BELT FILTER

[76] Inventor: Henri G. W. Pierson, 98 London Rd., Bozeat, Wellingborough, Northamptonshire, England

[21] Appl. No.: 327,207

[22] Filed: Dec. 3, 1981

[30] Foreign Application Priority Data

Feb. 18, 1981 [GB] United Kingdom ............... 8105144

[51] Int. Cl.³ ............................................. B01D 33/04
[52] U.S. Cl. ..................................... 210/350; 210/386; 210/400; 210/406; 100/118; 100/211
[58] Field of Search ............... 210/783, 791, 138, 141, 210/142, 143, 153, 160, 297, 324, 350, 386, 400, 401, 406, 407; 100/118, 211

[56] References Cited

U.S. PATENT DOCUMENTS

| | | | |
|---|---|---|---|
| 3,307,704 | 3/1967 | Pashaian | 210/400 |
| 3,506,128 | 4/1970 | Pashaian | 210/400 |
| 3,870,641 | 3/1975 | Pierson | 210/400 |
| 4,008,158 | 2/1977 | Davis | 210/400 |
| 4,081,375 | 3/1978 | Deal | 210/400 |
| 4,147,635 | 4/1979 | Crowe | 210/401 |
| 4,153,550 | 5/1979 | Lautrette | 210/401 |
| 4,203,836 | 5/1980 | Hallack | 210/406 |
| 4,285,815 | 8/1981 | Gallottini | 210/406 |
| 4,310,414 | 1/1982 | Lux | 210/406 |
| 4,324,659 | 4/1982 | Titoff | 210/401 |

*Primary Examiner*—Ernest G. Therkorn
*Attorney, Agent, or Firm*—Ross, Ross & Flavin

[57] ABSTRACT

Slurry required to be filtered is supplied to a downwardly inclined feed section of intermittently-moving belt 25 by way of supply pipe 20. Inclination of succeeding vacuum section of belt 25, over vacuum boxes 17, ensures even distribution of thin layer of slurry over belt 25, dependent upon angle of inclination, in range 4° to 20° to horizontal (an angle of 8° being illustrated).

Subsequently resultant filter cake layer is subjected to mechanical dewatering by an expansible membrane of a lower pressure plate 23 being expanded to press belt 25 with filter cake thereon against underside of counterplate 24.

11 Claims, 1 Drawing Figure

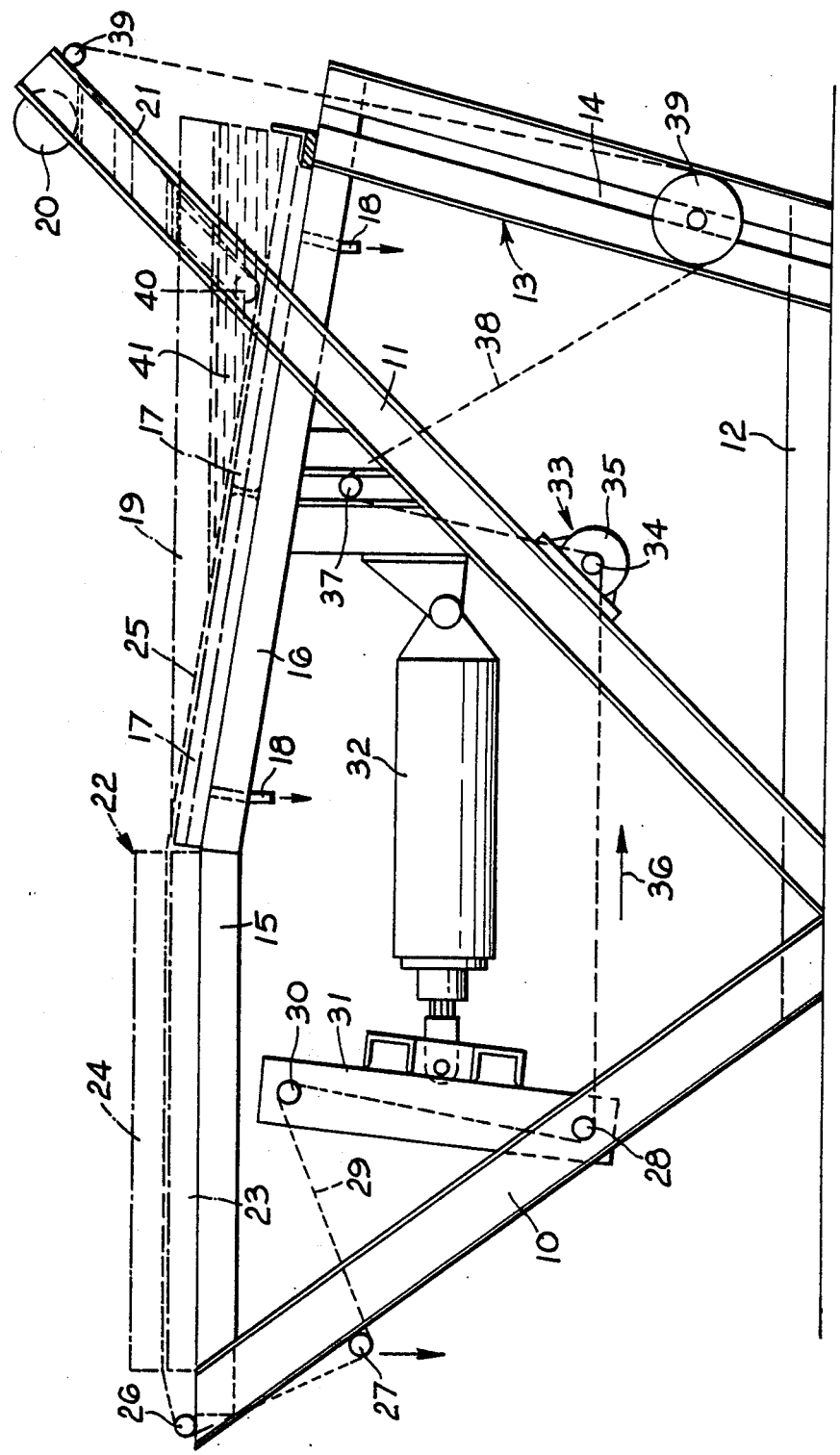

VACUUM BELT FILTER

This invention concerns vacuum belt filters.

It is well established that resistance to dewatering of filter cake in vacuum belt filters and like vacuum-type filters is more or less proportional to the thickness of the filter cake. For this reason, it is important that the cake thickness should be kept to the absolute minimum consistent with good cake discharge.

Rotary drum-type vacuum filters, as already known, have the capability of being operated to produce cake of optimum minimum thickness; however, they suffer the disadvantage that the curvature of the drum makes it impractical to apply mechanical pressure to the cake after it has been formed, so that the dewatering is dependent wholly on the pressure differential obtainable with the vacuum pump by which suction is applied to the drum.

Certain horizontal vacuum belt filters embody compression means enabling pressure to be applied mechanically to the filter cake once it has been formed. Some vacuum belt filters include an intermittently moving belt and the vacuum is applied and the compression means is operative during stationary phases of the belt. Alternatively, some vacuum belt filters include a continuously moving filter belt, in which case the vacuum means and the compression means more cyclically, firstly in the direction of travel of, and in sychronism with, the belt whilst applying a vacuum or pressure respectively to the belt and, secondly, while the vacuum and pressure respectively are released, the vacuum means and compression means return to their respective starting positions. Such filters suffer from the disadvantage of not being able to spread a cake which is thin enough to permit optimum dewatering efficiency. Generally, on such a horizontal vacuum belt filter a filter cake cannot be formed to a thickness much less than 2 mm, and in many instances the minimum achievable thickness is much greater than 2 mm.

An object of the present invention is, therefore, to provide an improved form of vacuum belt filter which has the advantage, over the known horizontal vacuum belt filters, that it can be operated to produce optimally thin filter cake so that optimum dewatering can be achieved, the filter construction being such that it can, if desired, incorporate means whereby mechanical pressure may be applied to the cake.

With this object in view, the present invention provides a vacuum belt filter comprising an endless belt guided to pass a feed station at which slurry for filtration is supplied to its upper surface and thence over one or a succession of vacuum chambers, and progressing means for progressing the belt so that successive areas thereof are subjected to vacuum to deposit filter cake thereon from the slurry characterised in that the vacuum chamber or at least a first of the vacuum chambers, and a vacuum section of the belt thereabove, is upwardly inclined, in the direction of movement of the belt, by an angle of from 4° to 20° to the horizontal.

Preferably the said angle is substantially 8°.

In a preferred embodiment of the vacuum belt filter of the invention the vacuum chamber or the first of the vacuum chambers is superimposed by a retainer structure for retaining slurry on the belt whilst being subjected to vacuum.

The feed station of the vacuum belt filter of the invention may comprise means, such as a feed pipe, for supplying the slurry to a feed section of the belt, which feed section inclines downwardly towards the vacuum section of the belt. Such a feed pipe is conveniently supported above the vacuum chamber or the first of the vacuum chambers for slurry to flow into the space defined by the retainer structure.

In the said preferred embodiment of the belt filter of the invention, the belt moves intermittently. The progressing means is operative to move the belt stepwise and comprises means for successively increasing and decreasing the extent of a bight in a return run of the belt, unidirectional means permitting the belt to move in one direction only, and a tensioner which maintains the belt under tension.

The filter preferably has, subsequent to the vacuum chamber or chambers, a compression section, which is advantageously substantially horizontal, in which the belt, and any filter cake thereon, is subjected to pressure for expressing liquid therefrom.

The invention will be described further by way of example, with reference to the accompanying drawing in which the single FIGURE is a diagrammatic side elevation illustrating a preferred practical embodiment of the vacuum belt filter of the invention.

The illustrated preferred embodiment of the vacuum belt filter of the invention comprises a supporting frame including, at each side of the structure, a front girder 10 and an intermediate girder 11 extending upwards at an angle to one another from one end of a base girder 12, as well as a rear girder assembly 13, defining a central slot 14, extending upwards at a slight angle from the other end of the base girder 12. The supporting frame supports side bearers 15, 16 of which the side bearers 15 connect with the upper ends of the front girders 10 and extend substantially horizontally between the latter and the side bearers 16 which extend upwardly from the rear girder assemblies 13, past the intermediate girders 11 at an angle in the range from 4° to 20°, preferably of the order of 8°.

The inclined side bearers 16 support a plurality of successive vacuum boxes 17 of which there are two shown in the illustrated embodiment. Suction ducts 18 from the boxes 17 extend by way of separate or common liquid receptacles (not shown) to a vacuum pump (also not shown). Supported above the vacuum boxes 17 is a retainer structure, indicated generally at 19.

The upper ends of the intermediate girders 11 support a slurry supply pipe 20 disposed above an inclined deflector plate 21 supported between the girders 11 and terminating at its bottom edge above the retainer structure 19.

Supported by the side bearers 15 is a mechanical compression assembly indicated generally by the reference numeral 22 and comprising a lower pressure plate 23 including, for instance, an expansible membrane (not visible) which can be expanded upwards towards and to press against a fixed counter-plate 24.

An endless filter belt 25 of the filter extends in a vacuum section over the vacuum boxes 17 after which it passes between the pressure plate 23 and the counter-plate 24.

From the latter it extends around a guide roller 26 to a cake discharge roller 27 whence it passes to a pivot roller 28 by way of a bight 29 around a progressing roller 30 carried by arms 31 which are swingable about an axis provided by the pivot roller 28. A pneumatic or other suitable ram 32 is provided for swinging the arms 31 and it will be appreciated that each swinging movement has the effect of increasing or decreasing the extent of the bight 39. From the pivot roller 28, the belt 25 passes to a unidirectional device, indicated generally by the reference number 33, comprising a roller 34 and a freewheel or pawl and ratchet arrangement 35 the effect of which is to permit the belt 25 to move only in the direction of arrow 36 and to prevent movement of the belt 25 in the opposite direction. From the roller 34, the belt 25 extends over a guide roller 37 and then downwards in a tensioner loop or bight 38 around a heavy tensioning roller 39 guided by its ends in the slots 14 of the rear girder assemblies 13 so as to be slideable up and down under its own weight. From the tensioner loop or bight 38, the belt 25 extends around a rear guide roller 39 at the upper end of the intermediate girders 11 adjacent to the slurry supply pipe 20 into a feed section which is defined between the rear guide roller 39 and a submerged guide roller 40 at the commencement of the vacuum section of the belt 25, where the latter starts to pass over the vacuum boxes 17, 17 as previously referred to.

The mode of operation of the filter will readily be appreciated from the foregoing description. Slurry required to be filtered is supplied to the feed section of the belt 25 by way of the supply pipe 20, this feed section being downwardly inclined below the pipe 20 and carrying the slurry down to a reserve mass 41 thereof contained within the retainer structure 19. A thin layer of solid or filer cake is formed on the inclined vacuum section of the belt 25, and the belt is progressed stepwise in the direction indicated by the arrow 36 so that such filter cake layer is carried stepwise through the mechanical compression assembly 22 whereat it is subjected to mechanical dewatering by the expansible membrane of the lower pressure plate 23 being expanded to press the belt 25, with the filter cake thereon firmly up against the underside of the counterplate 24. As the filter cake is moved stepwise through the compression assembly 22 it is caused progressively to become dryer, and it emerges from the said assembly 22 with a very low water content but still adherent to the belt, after which it passes around the guide roller 26. The dry filter cake eventually separable from the belt 25 at the discharge roller 27, its adhesion to the belt 25 being insufficient to retain it on the belt through the deflection, caused by the roller 27, which would require the cake to adhere to the underside of the belt 25.

The inclined disposition of the vacuum section of the belt, extending over the vacuum boxes 17 (which may be replaced by only a single vacuum box or by more than two said boxes), ensures good distribution of the slurry over the belt 25 so as to achieve a very thin slurry layer, which is dependent upon the angle of inclination of the vacuum section. In the illustrated case, the angle is of the order of 8° to the horizontal, but the inclination can be selected, for example in the range of 4° to 20° to the horizontal as may be desired or found to be appropriate, e.g., according to filter cake thickness required to be achieved.

Progression of the belt 25 is achieved by means of the ram 32, in synchronism with the application of vacuum to the boxes 17 and expansion of the membrane of the compression assembly 22, as follows. Whilst the vacuum is switched off and the membrane is relaxed, the ram 32 is actuated to swing the arms 31 in a clockwise direction, as considered in the drawing, so that the amount of the belt present in the bight 29 is increased by the amount by which the belt 25 is required to be progressed. Since the unidirectional device 33 prevents the belt, in the section between the pivot roller 28 and the device 33, from moving in the direction opposed to the arrow 36, the belt length taken into the bight 29 is drawn from the upper run of the belt, this being permitted by the tensioning roller 39 which rises in the slot 14 and maintains the belt under tension. Upon sufficient movement of the belt 25 having been achieved, the vacuum is switched on again to the boxes 17 once again, and the membrane of the compression assembly 22 is inflated. Thus, not only is the filter cake dewatered, but also the belt 25 is held stationary. Whilst this is happening, the ram 32 is returned to its initial position, with the result that the extent of the bight 29 is reduced the reduction being taken into the tensioner bight 38 by the roller 39.

The invention is not confined to the precise details of the foregoing example, and variations may be made thereto. In particular, the belt may be progressed continuously rather than intermittently as described above, and the arrangement for applying a vacuum and for applying pressure to the slurry or filter cake will vary accordingly. For example, one or more vacuum boxes and a compression assembly may themselves be moved to and fro with respect to the path of the continuously moving belt.

The structure of the belt filter may vary in its form and/or configuration from what is shown. It may be longer and incorporate more vacuum boxes and additional compression assemblies as may be desired. It may further include means for recirculating filtrate drawn off from one or more of the vacuum boxes 17 back to one or more washing nozzles which spray the filtrate back over the filter cake prior to reaching the compression assembly. The apparatus may be adapted to enable the vacuum section of the belt to be adjusted in its angle of inclination according to the particular slurry being handled at any time. The compression assembly is not essential to the invention and may be omitted, and the manner of progressing the belt may differ from what has been described. Other modifications are possible.

I claim:

1. In a vacuum belt filter mechanism for filtering a filtrate from a slurry the combination of: an endless filter belt movable unidirectionally through a forwardly advancing upper working run and a lower return run, drive means for driving the belt intermittently, guide means for guiding the belt through a feed section and a vacuum section of the upper working run, the belt in the vacuum section being upwardly inclined in the forward advancing direction of belt movement by an angle of from 4° to 20° to the horizontal, feed means for feeding the slurry onto the belt at the feed section, and vacuum means positioned below belt at the vacuum section and being operative for exerting a vacuum and draining the slurry through the belt leaving a filter cake residue deposited on the belt, the drive means being operative for belt advancement only when the vacuum means is non operative.

2. In the mechanism as set forth in claim 1 wherein: the angle of inclination of the belt in the vacuum section is 8° to the horizontal.

3. In the mechanism as set forth in claim 1 wherein: the feed means comprises a feed pipe supported above the belt in the feed section.

4. In the mechanism as set forth in claim 1 and further including: a retainer defining a slurry accomodating space above the vacuum means and being operative for retaining the slurry on the belt during sectioning.

5. In the mechanism as set forth in claim 1 wherein: the feed section inclines downwardly towards the vacuum section of the belt.

6. In the mechanism as set forth in claim 1 and further including: means for successively increasing and decreasing the extent of a bight in the belt return run, and tension means for tensioning the belt.

7. In the mechanism as set forth in claim 6 and further including: a fixed pivot roller having an axis, arms connected to the pivot roller and swingable about the axis, a movable progressing roller carried by the arms, and a ram operative for swinging the arms to move the progressing roller to and fro for successively increasing and decreasing the extent of the bight in the belt return run.

8. In the mechanism as set forth in claim 6 wherein: the tension means comprises a tensioning roller in the belt return run.

9. In the mechanism as set forth in claim 8 and further comprising: a framework including girder assemblies having slots therein, the tensioning roller having its ends guided in the lots for sliding movement up and down under its own weight and maintaining the belt tension.

10. In the mechanism as set forth in claim 1 and further including: the upper working run of the belt passing through a compression section following the feed and vacuum sections, a compression assembly disposed in the compression section for subjecting the belt and filter cake thereon to pressure in expressing liquid from the filter cake.

11. In the mechanism as set forth in claim 10 wherein: the compression assembly includes a lower pressure plate disposed below the compression section of the belt and having an upper surface presented thereto, an upper counterplate disposed above the compression section of the belt, an expansible membrane attached to the upper surface of the lower pressure plate, and means for expanding the membrane upwardly to press the compression section of the belt and any filter cake thereon against the upper counterplate for expressing liquid from the filter cake.

* * * * *